Aug. 26, 1930.  J. LEUZINGER  1,774,022
FOUR-WHEEL HYDRAULIC BRAKE FOR TRAILERS
Filed Aug. 25, 1928

Inventor:
Jakob Leuzinger
By Emil Bønnelycke
Attorney

Patented Aug. 26, 1930

1,774,022

UNITED STATES PATENT OFFICE

JAKOB LEUZINGER, OF ZURICH, SWITZERLAND, ASSIGNOR TO A. WELTI-FURRER A.-G., OF ZURICH, SWITZERLAND, A CORPORATION OF SWITZERLAND

FOUR-WHEEL HYDRAULIC BRAKE FOR TRAILERS

Application filed August 25, 1928, Serial No. 301,992, and in Germany and Switzerland October 11, 1927.

The invention relates to a four-wheel brake for a trailer, operative when the trailer runs up on or attempts to approach the motor vehicle. The construction comprises a brake cylinder for each wheel which is connected to a main brake cylinder, carried by the draft member of the trailer. In order to obtain a gradual application of the brake with such hydraulic brakes, the cross-sectional area of the passages for the fluid between opposite sides of the piston in the main cylinder is made to depend upon the position of the piston, while the pressure in the brake pipes gradually increases. The variation of the size of said passage is accomplished by a sleeve or bushing in the main cylinder, which forms, with the cylinder wall, an annular chamber and which is provided with a series of holes or perforations, which are covered more or less by the piston, depending upon the position of the latter.

An embodiment of the invention is shown in the accompanying drawing, in which.

Figure 1:
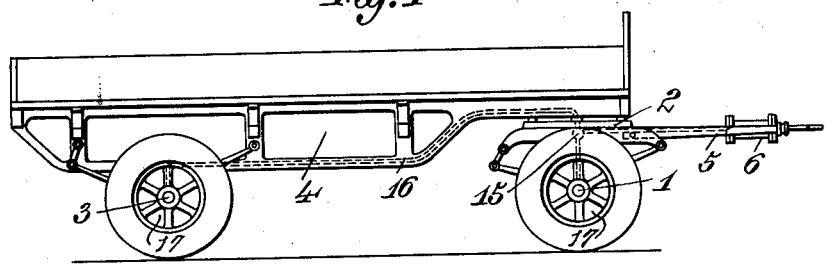
Figure 1 is a side elevation of the trailer of a motor vehicle.
Figure 2:
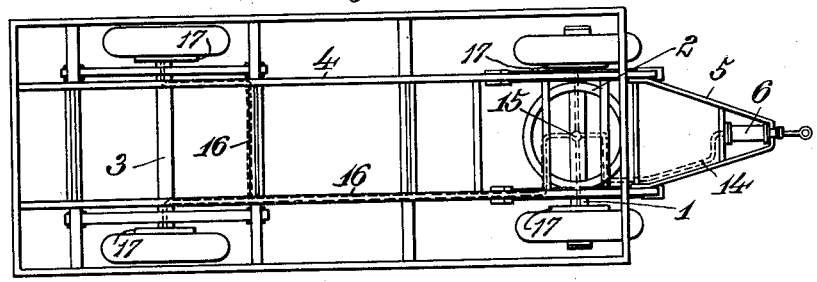
Fig. 2 is a plan view of the trailer.

The trailer shown in the drawing has two axles 1 and 3. The front axle 1 is connected to the chassis or frame 4 through a turntable 2, and the rear axle 3 is directly connected to the chassis. The wheels, mounted on the axles, are provided with a fluid brake mechanism, all of which are applied simultaneously and uniformly by a main brake cylinder 6, carried on the trailer draft member 5. A sleeve 7, mounted concentrically in the cylinder 6, forms an annular chamber 8 between it and the cylinder wall, said chamber being in communication with the interior of said sleeve through a series of holes or perforations 9. Piston 10 has a sliding fit in the sleeve 7 and the piston rod 11, passing through the stuffing-box 12, carries a coupling ring 13 on its outer end. The cylinder spaces are filled with a brake fluid. When the piston moves in either direction, the fluid is forced from one side of the piston to the other through the holes 9 in the sleeve 7 and the chamber 8. The cylinder 6, therefore, acts in the manner of a buffer between the draft member 11, which is connected to the motor vehicle by the ring 13, and the trailer. From cylinder 6 a pipe 14 leads to the distributor member 15, from which pipes 16 branch off, leading to the brake mechanisms 17 of the several wheels.

Figure 3:
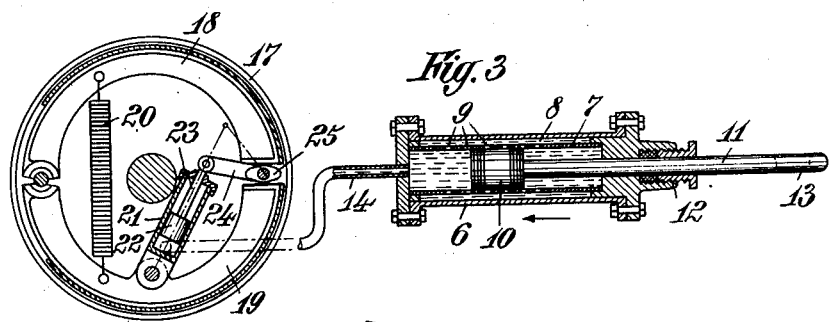
Fig. 3 is a part side view and part sectional view, on a larger scale, of the brake of one wheel and the main brake cylinder.
Figure 4:
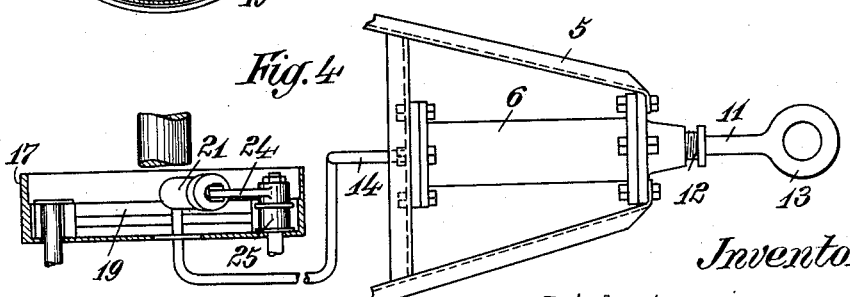
Fig. 4 is a part sectional and plan view of the brake of a wheel and the main cylinder.

Any suitable mechanism can be utilized for the wheel brakes and in the example shown, the construction comprises a two-shoe internal brake of ordinary type, in which two semi-circular shoes 18 and 19 are mounted in a brake drum 17. The shoes are retracted or maintained from contact with the brake drum by a tension spring 20. To the lower shoe 19, a brake cylinder 21 is pivoted in which a piston 22 slides. The piston rod 23 is pivoted to a lever 24 of the brake cam 25. Therefore, when the piston moves upwardly, as shown in Fig. 3, the shoes are forced apart against the braking surface of the drum. The braking effect results as soon as the fluid in cylinders 6 and 21 is placed under pressure.

The operation is as follows:

When the speed of the motor vehicle, to which the trailer is attached, is reduced, the rod 11 of the trailer is retarded or forced into the cylinder 6. On the other hand, the trailer at first retains its original speed and approaches or tends to approach the motor vehicle. Consequently, the piston 10 moves relatively to and in the cylinder 6 in the direction of the arrow. A portion of the fluid on the front side of the piston is, therefore, forced through the perforations 9 in sleeve 7 into the annular chamber 8 and from there through the perforations 9 into the space behind the piston, so that the full pressure is not set up immediately in the installations 14, 15 and 16 and, even with a sudden stop, no shock occurs. Depending upon the number of perforations 9 covered by the piston 10, the passage for the fluid is more or less contracted. The buffer action, therefore, gradually diminishes, while the pressure in the brake pipes gradually increases. The maximum pressure is obtained when all the perforations 9 are covered. The application of the several brakes is therefore also gradual. When the pressure in the pipes is relieved, the springs 20 automatically release the brakes.

This apparatus permits, with four-wheel brakes, the front-axle or turntable to be rotated through 360°, which is not practically possible with mechanically operated brakes. This can be accomplished by inserting a ball and socket joint for the pipes to provide a communication for the liquid fluid in any position. Any suitable joint can be inserted at the point 15 and in Fig. 1 a ball is shown in which a socket can be inserted without any difficulty.

I claim as my invention:

1. A hydraulic brake operating mechanism for trailers comprising a cylinder; a perforated sleeve mounted in said cylinder in spaced relation; and a piston mounted in said sleeve, the cylinder and sleeve providing a passage for the fluid from one side of the piston to the other and through the perforations.

2. A hydraulic brake operating mechanism for trailers comprising a cylinder; a perforated sleeve mounted in said cylinder in spaced relation; a piston mounted in said sleeve; and a piston rod secured to said piston at one end and adapted to have a vehicle secured thereto at the other end, said cylinder and sleeve providing a passage for the fluid therebetween due to the spaced relation to afford passage of the fluid from one side of the piston to the other.

3. A hydraulic brake operating mechanism for trailers comprising a cylinder; a piston mounted in said cylinder; and means for forming a passage between the inner wall of the cylinder and the piston to permit passage of the fluid from one side of the piston to the other side.

4. A hydraulic brake operating mechanism for trailers comprising a main brake cylinder carried by the draft member of the trailer; a sleeve mounted in said cylinder in spaced relation thereto; and a piston in said sleeve, said cylinder and sleeve providing a passage therebetween for the fluid from one side of the piston to the other side.

5. A hydraulic brake operating mechanism for trailers comprising a main brake cylinder carried by the draft member of the trailer; a sleeve mounted in said cylinder in spaced relation thereto; a piston in said sleeve, said cylinder and sleeve providing a passage therebetween for the fluid from one side of the piston to the other side; and a rod secured at one end to the piston and the other end being adapted to be connected to a vehicle.

In testimony whereof I affix my signature.

JAKOB LEUZINGER.